(12) United States Patent
Durvasula et al.

(10) Patent No.: US 10,996,934 B2
(45) Date of Patent: *May 4, 2021

(54) SYSTEMS AND METHODS FOR COMPARING COMPUTER SCRIPTS

(71) Applicant: ServiceNow, Inc., Santa Clara, CA (US)

(72) Inventors: Sreenivas Durvasula, Hyderabad (IN); Prabodh Saha, Hyderabad (IN); Venkata Naga Manoj Barthipudi, Hyderabad (IN); Amitav Mohanty, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,758

(22) Filed: May 1, 2020

(65) Prior Publication Data

US 2020/0257511 A1    Aug. 13, 2020

Related U.S. Application Data

(63) Continuation of application No. 16/036,609, filed on Jul. 16, 2018, now Pat. No. 10,664,248.

(51) Int. Cl.
*G06F 8/41* (2018.01)
*G06F 16/955* (2019.01)

(52) U.S. Cl.
CPC ............ *G06F 8/436* (2013.01); *G06F 16/955* (2019.01)

(58) Field of Classification Search
CPC ............................... G06F 16/955; G06F 8/436
See application file for complete search history.

(56) References Cited

U.S. PATENT DOCUMENTS

| 5,282,698 A | 2/1994 | Wright et al. |
| 6,067,357 A | 5/2000 | Kishinsky et al. |
| 6,432,339 B1 | 8/2002 | Jens et al. |
| 6,581,029 B1 | 6/2003 | Fischer |

(Continued)

FOREIGN PATENT DOCUMENTS

EP    255109 A2    2/2013

OTHER PUBLICATIONS

Mahboubi et al., "Canonical Structures for the working Coq user" (Year: 2013).*

(Continued)

*Primary Examiner* — Phillip H Nguyen
(74) *Attorney, Agent, or Firm* — Fletcher Yoder PC

(57) ABSTRACT

The present disclosure relates generally to analyzing and comparing computer scripts, and more specifically, to determining semantic similarities between syntactically different scripts. An example computing system includes a memory configured to store a database, wherein the database is configured to store script canonical form (SCF) representations of scripts, and wherein each SCF representation is a topologically-sorted, labeled, directed graph that includes tables and datasets as nodes, actions as edges, and predicates as labels. The system includes a processor configured to execute instructions stored in the memory to cause the computing system to perform actions including: generating a first SCF representation of a first script, and storing the first SCF representation of the first script in the database.

20 Claims, 11 Drawing Sheets

(56) References Cited

U.S. PATENT DOCUMENTS

| | | |
|---|---|---|
| 6,678,887 B1 | 1/2004 | Hallman |
| 6,799,189 B2 | 9/2004 | Huxoll |
| 6,816,898 B1 | 11/2004 | Scarpelli |
| 68,955,868 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,440,955 B2 | 10/2008 | Khandelwal et al. |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidari |
| 7,933,927 B2 | 4/2011 | Dee |
| 7,945,860 B2 | 5/2011 | Vambenepe |
| 7,996,819 B2 | 8/2011 | Okada |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,666,999 B2 | 3/2014 | Havel et al. |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,495,186 B1 | 11/2016 | Ben-Yair et al. |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,792,387 B2 | 10/2017 | George |
| 9,805,322 B2 | 10/2017 | Kelkar |
| 9,852,165 B2 | 12/2017 | Morozov |
| 9,984,105 B2 | 5/2018 | Freed et al. |
| 10,002,203 B2 | 6/2018 | George |
| 2004/0098670 A1* | 5/2004 | Carroll ............ G06N 5/046 715/243 |
| 2004/0162872 A1 | 8/2004 | Friedman et al. |
| 2004/0163037 A1 | 8/2004 | Friedman et al. |
| 2006/0004528 A1 | 1/2006 | Uehara et al. |
| 2007/0239993 A1 | 10/2007 | Sokolsky et al. |
| 2009/0217100 A1 | 8/2009 | Grechanik et al. |
| 2010/0088668 A1 | 4/2010 | Yoshihama et al. |
| 2012/0317544 A1 | 12/2012 | Komatsuzaki et al. |
| 2013/0191439 A1 | 7/2013 | Kern et al. |
| 2015/0046492 A1 | 2/2015 | Balachandran |
| 2015/0128032 A1 | 5/2015 | Staykov et al. |
| 2015/0310195 A1* | 10/2015 | Bailor ............ G06F 21/316 726/6 |
| 2016/0291960 A1 | 10/2016 | Chen et al. |
| 2016/0364473 A1 | 12/2016 | Fontenot et al. |

OTHER PUBLICATIONS

Wehmuth et al., "MultiAspect Graphs: Algebraic Representation and Algorithms" (Year: 2016).*

Wright et al., "The MPO API: A Tool for Recording Scientific Workflows" (Year: 2014).

Buhwan Jeong, "Machine-Learning based Semantic Similarity Measures to Assist discovery and Reuse of Data Exchange XML Schema" (Year: 2005).

Don Brutzman, "The Virtual Reality Modeling Language and Java" (Year:1998).

Freedomenv.com, "FE Tcl-Tk Systems a Canonical Structure for Tcl-Tk Coding of GUI's" (Year:2019).

Sakr et al., "Graph Indexing and Querying: a Review" (Year: 2010).

Lord et al., "Semantic Similarity Measures as Tools for Exploring the Gene Ontology" (Year: 2002).

Jinrong Li et al.: "Design and Implementation of Semantic Matching Based Automatic Scoring System for C Programming Language", Aug. 16, 2010, Entertainment for Education, Digital Techniques and Systems, Springer Berlin, Heidelberg, pp. 247-257; XP019147298.

M.L. Kammer: "Plagiarism detection in Haskell programs using call graph matching", Utrcht University, Master's thesis, May 31, 2011, pp. 1-87, XP055229203.

Anupam Bhattacharjee et al.: "CodeBlast", Applied Computing, ACM, New York, USA, Mar. 18, 2013, pp. 846-852, XP058016672.

* cited by examiner

```
var target = new GlideRecord('incident');
target.addQuery('priority',1);
target.addQuery('sys_created_by','xyg');
target.query();

while(target.next()){
gs.print(target.getValue("number"));
target.number = target.number + 1;
target.update();
} var user = new GlideRecord('sys_user');
if(user.get("sys_id string")){
gs.print(user.name);
}
```

```
var u = new GlideRecord('sys_user');
if(u.get("sys_id string")){
gs.print(u.getValue(name));
} var targetTable = 'incident';
var rec = new GlideRecord(targetTable);
rec.addQuery('sys_created_by', 'xyg');
rec.addQuery('priority',1);
rec.query();

while(rec.next()){
gs.print(rec.number);
rec = rec.number + 1;
rec.update();
}
```

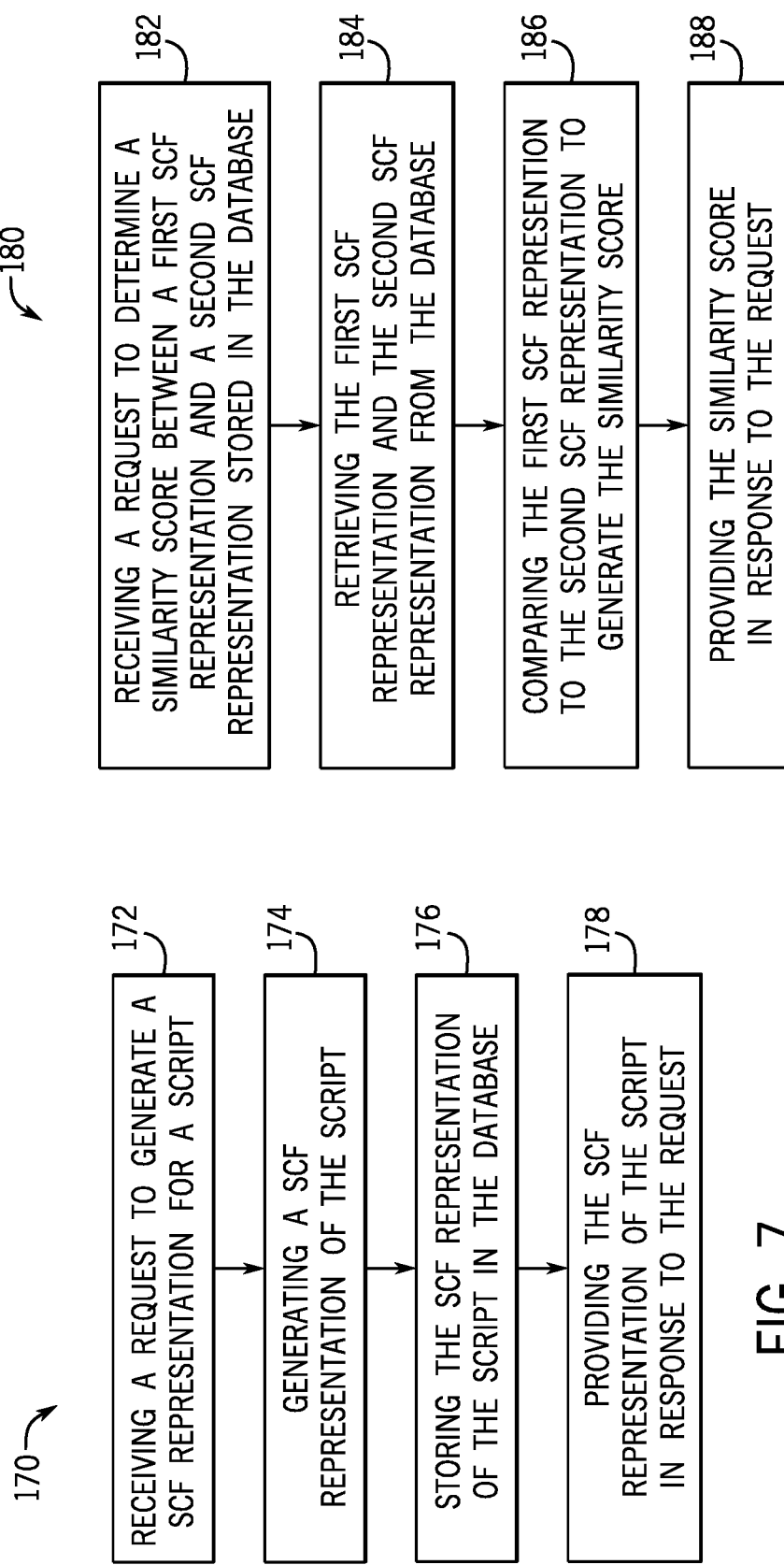

SYSTEMS AND METHODS FOR COMPARING COMPUTER SCRIPTS

CROSS-REFERENCE TO RELATED APPLICATION

This application is a continuation of U.S. patent application Ser. No. 16/036,609, filed Jul. 16, 2018, and entitled, "SYSTEMS AND METHODS FOR COMPARING COMPUTER SCRIPTS," which is herein incorporated by reference.

BACKGROUND

The present disclosure relates generally to analyzing and comparing computer scripts, and more specifically, to determining semantic similarities between different scripts.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

A client instance hosted by such a cloud computing service may include out-of-the-box and customized scripts that are each designed to perform specialized tasks. In certain cases, hundreds or thousands of scripts may be created to meet particular client demands. As a result, functionally redundant scripts can be inadvertently created, which reduces developer efficiency and increases development costs. While two scripts can easily be syntactically compared, for example, by comparing a hash or digest of the scripts, even a subtle difference between the scripts (e.g., whitespace, comments) can result in the scripts being determined to be different. As such, syntactical comparison is especially limited in being able to determine whether two scripts perform the same function from a semantic perspective. Accordingly, it is presently recognized that it would be useful to be able to semantically compare scripts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a computer script analysis system. In particular, present embodiments enable the generation of script canonical form (SCF) representations of computer scripts, as well as the storage of these SCF representations within a database. Once the database is suitably populated with SCF representations, present embodiments can receive requests to compare two SCF representations stored in the database, and in response, determine and provide a numerical similarity score with respect to the two scripts. Additionally, present embodiments are designed to receive search requests that include script metadata conditions, and in response, determine and provide a list of SCF representations stored in the database that match the indicated script metadata conditions. It is presently recognized that the disclosed script analysis system enables different useful functionality, such as reducing duplication, improving script review, improving development efficiency, and promoting script reuse/recycling.

BRIEF DESCRIPTION OF THE DRAWINGS

Various aspects of this disclosure may be better understood upon reading the following detailed description and upon reference to the drawings in which:

FIGS. 5A and 5B are examples of two syntactically different scripts analyzed by the script analysis system, in accordance with embodiments of the present technique;

FIG. 7 is a flow diagram depicting an embodiment of a process whereby the script analysis system generates a SCF representation of a script in response to a request, in accordance with embodiments of the present technique;

FIG. 8 is a flow diagram depicting an embodiment of a process whereby the script analysis system compares the SCF representations of two scripts to generate a similarity score, in accordance with embodiments of the present technique;

DETAILED DESCRIPTION OF SPECIFIC EMBODIMENTS

Figure 1:
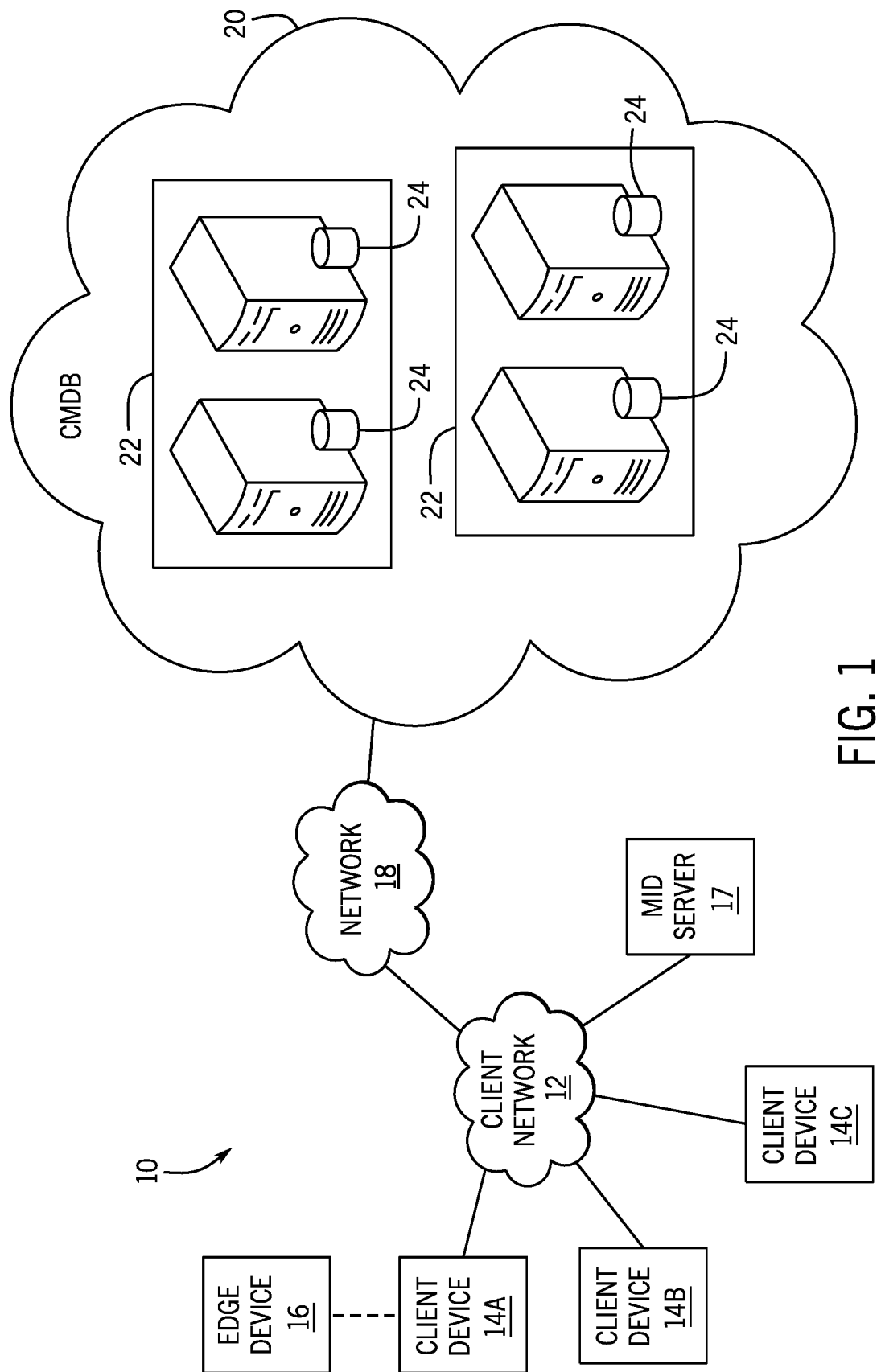
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" or "engine" refers to one or more computing modules, programs, processes, workloads, threads and/or a set of computing instructions executed by a computing system.

As used herein, the term "script" or "computer script" refers to a collection of instructions in a computer scripting language, such as scripts in a JAVA® or JavaScript, that are at least partially interpreted into computer-executable instructions at runtime. As used herein, the term "script canonical form (SCF)" or "SCF representation" refers to a topologically-sorted, labeled, directed graph that is uniquely representative of a script, wherein database tables and result sets are represented as nodes, actions are represented as edges, and filter/projection predicates are represented as labels. As used herein, the term "script metadata" collectively refers to the nodes, edges, and/or labels that may be part of a SCF representation. The terms "syntactic" and "semantic" are used herein in accordance with their customary meaning for programming languages within the field of computer science. For example, two scripts are syntactically equivalent when they include the exact same characters in the same order. In contrast, two scripts are semantically equivalent when they perform the same logical function(s), regardless of differences in syntax.

Present embodiments are directed to a computer script analysis system. In particular, present embodiments enable the generation of a script canonical form (SCF) representation of a received computer script and the storage of this SCF representation within a database. Once the database is sufficiently populated, present embodiments are designed to receive a request to compare the SCF representations of two scripts stored in the database, and in response, determine and provide a similarity score for the two scripts. Additionally, present embodiments are designed to receive a search request that includes script metadata conditions, and, in response, determine and provide a list of scripts stored in the database that match the indicated script metadata conditions.

It is presently recognized that the disclosed script analysis system enables different useful functionality, such as reducing script duplication, improving script review, improving development efficiency, and promoting script reuse/recycling. For example, by enabling the disclosed semantic script comparison technique, a first script can be determined to be semantically identical to another script, and as such, one of the scripts can be replaced with the other to reduce script duplication. By way of particular example, when two script are compared and determined to be semantically the same and syntactically different, then the script that includes the fewest or shortest commands may be determined to be more syntactically efficient. As such, the more syntactically efficient script and may be selected to replace the more verbose script, reducing script size and improving the efficiency of the system. It may be appreciated that this may also serve as a learning tool for developers to compare their scripts to others and identify more efficient ways of performing the same function using fewer or shorter commands, improving developer skills and efficiency.

In another example, the disclosed script analysis system improves script development. For example, the SCF representation of a script may be visually presented to a developer or reviewer as an additional or alternative manner to review code for logical errors. Additionally, in terms of avoiding logical errors when updating scripts, the disclosed script analysis system enables two versions of a script to be compared to ensure that, while the syntax may have changed between the two versions of the script, the two versions remain semantically identical, or, in other cases, intentional differences between the scripts can be readily identified and reviewed. In another example, before a developer creates a new script, the developer may first perform a search using script metadata that describes portions of the desired functionality, and receive a list of existing scripts that already include this functionality. This encourages code reuse and recycling, improving developer efficiency and reducing development costs.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
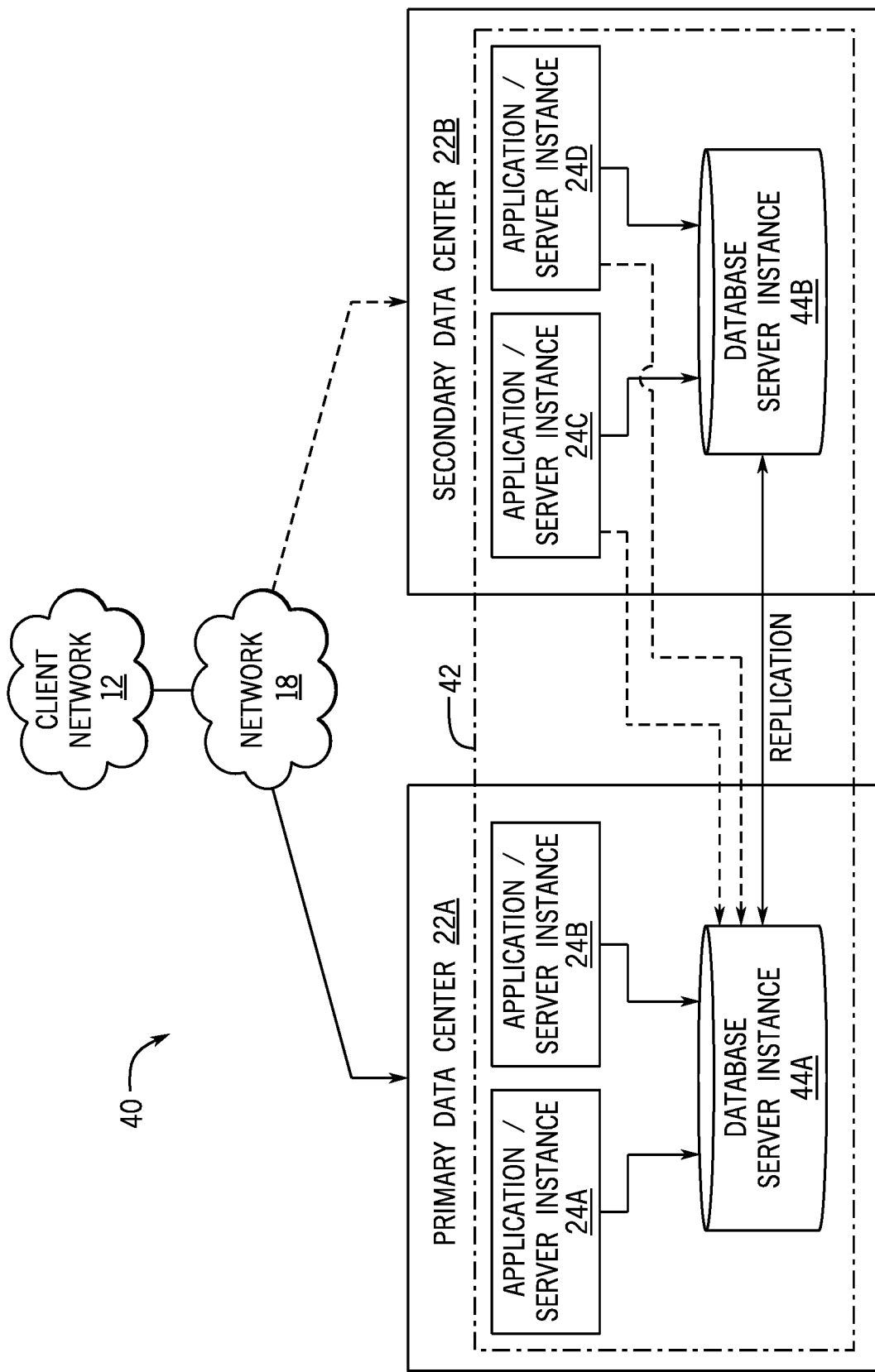
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
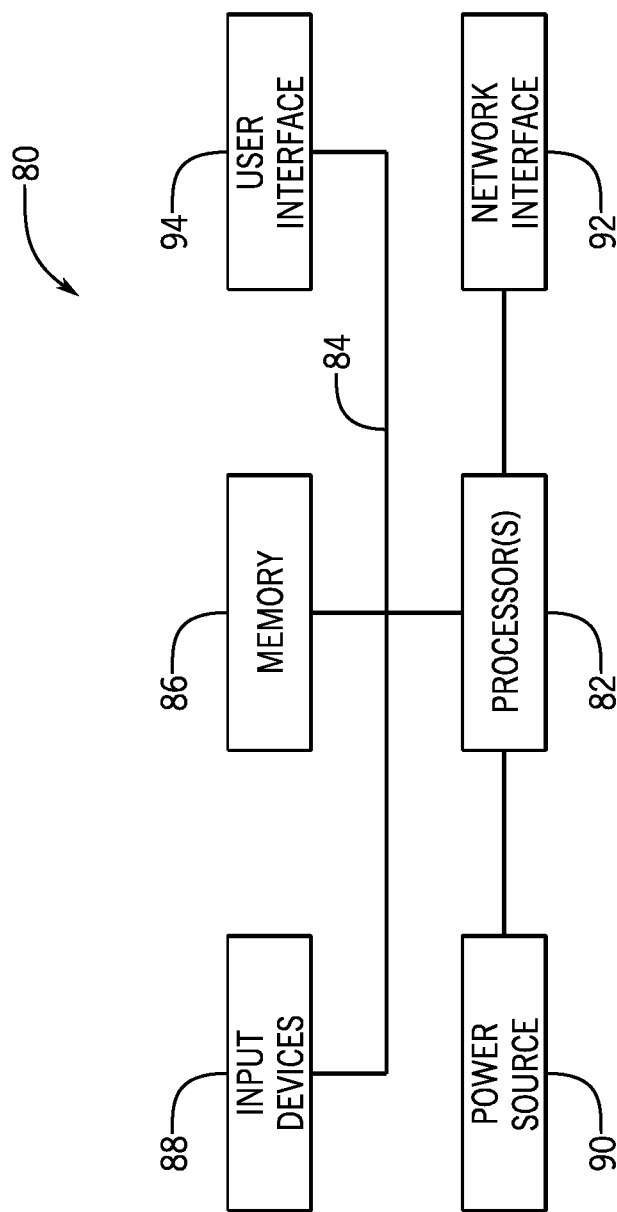
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
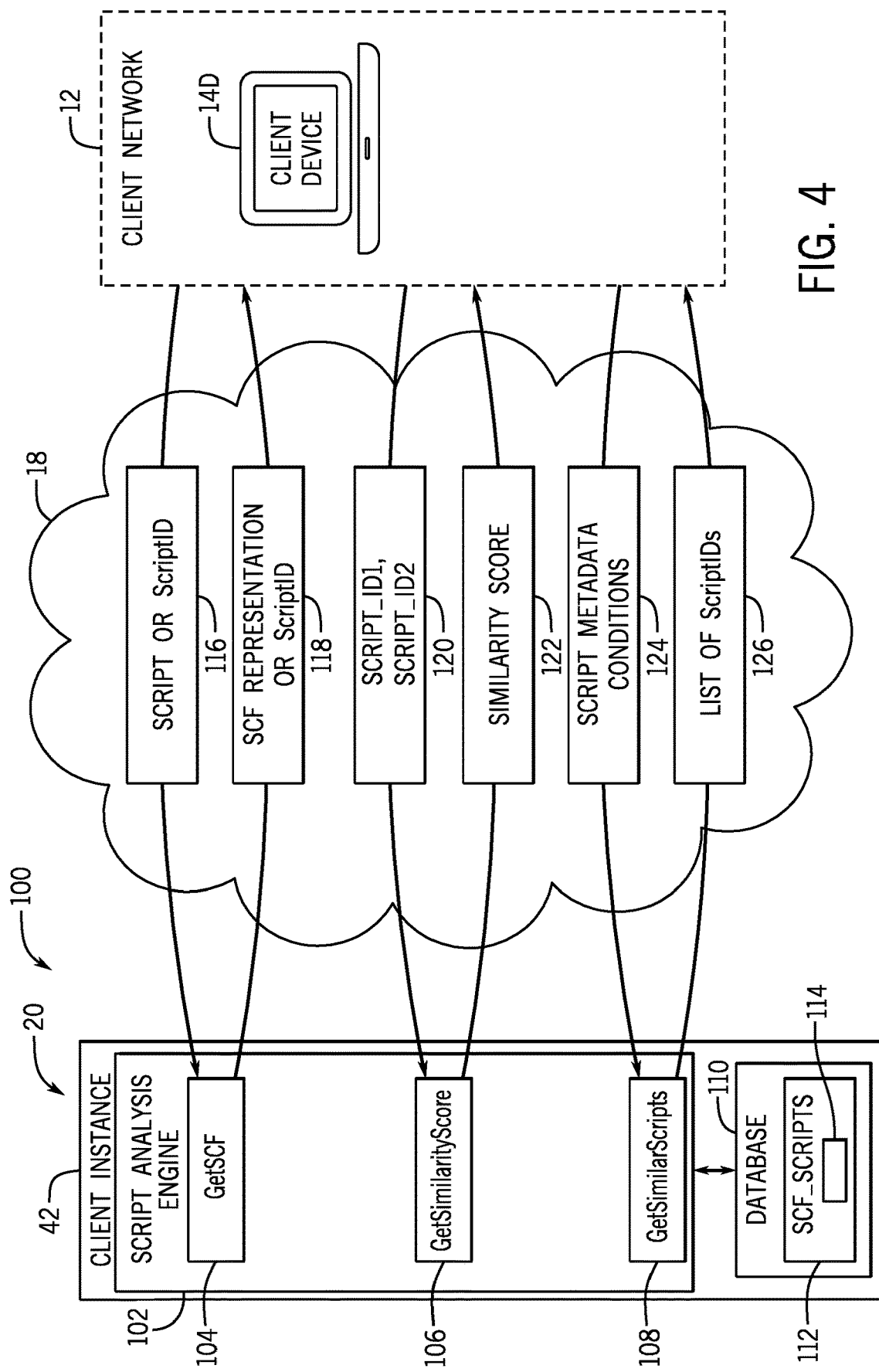
FIG. 4 is a schematic diagram illustrating a script analysis system designed to analyze computer scripts, generate script canonical form (SCF) representations of these scripts, and store the SCF representations within a database, in accordance with embodiments of the present technique.

With the foregoing in mind, FIG. 4 illustrates a script analysis system 100, in accordance with embodiments of the present technique. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

The illustrated client instance 42 includes a script analysis engine 102, which is an application including a number of modules that are stored in a suitable memory (e.g., memory 86) and executed by suitable processing circuitry (e.g., processor 82 of data center 22) to enable the disclosed functionality. For the illustrated embodiment, the script analysis engine 102 includes a "GetSCF" module 104, a "GetSimilarityScore" module 106, and a "GetSimilarScripts" module 108. As illustrated, the script analysis engine 102 is communicatively coupled to a database 110 (e.g., a database server instance 44A of FIG. 2) that is associated with the client instance 42. The database 110 includes tables storing data to support the client instance 42 and the script analysis system 100. In particular, the illustrated database 110 includes a "SCF_Scripts" table 112 that is designed to store SCF representations of scripts, as discussed below. Additionally, the "SCF_Scripts" table 112 includes a primary key field 114 (e.g., a "ScriptID" field) whose value is serves as a unique identifier for SFC representations within the "SCF_Scripts" table 112.

As mentioned, the client instance 42 is communicatively coupled to the client network 12 via the network 18. Accordingly, the client device 14D on the client network 12 may provide requests and receive responses from the script analysis engine 102. For example, for the illustrated embodiment, the client device 14D sends a request 116 to the "GetSCF" module 104 of the script analysis engine 102, wherein the request 116 may include a computer script in a suitable format (e.g., a string, a JSON (JavaScript Object Notation) object). In response to the request 116, the "GetSCF" module 104 generates a SCF representation of the received script and stores the generated SCF representation in the "SCF_Scripts" table 112 of the database 110. In certain embodiments, the "GetSCF" module 104 may provide a response 118 that includes an identifier (e.g., a "ScriptID" value) that uniquely identifies the SCF representation of the script within the "SCF_Scripts" table 112 of the database 110. In certain embodiments, the response 118 may additionally or alternatively include the generated SCF representation in a suitable format (e.g., a string, an object), to enable the client device 14D to visually present the SCF representation to a user for review. Additionally, in certain embodiments, the "GetSCF" module 104 may also respond to requests 116 that instead include an identifier (e.g., a "ScriptID") that uniquely identifies a SCF representation within the "SCF_Scripts" table 112, and may generate and provide to the client device 14D corresponding responses 118 that include the identified SCF representation in a suitable format.

As discussed in greater detail below, the "GetSimilarityScore" module 106 of the script analysis engine 102 is designed to compare two SCF representations stored in the "SCF_Scripts" table 112 of the database 110. That is, once the "SCF_Scripts" table 112 has been populated using the "GetSCF" module 104, as mentioned, the "GetSimilarityScore" module 106 is designed to receive a request 120 that includes two identifiers (e.g., "ScriptID1", "ScriptID2"), each of which uniquely identifying a particular SCF representation in the "SCF_Scripts" table 112. In response to receiving the request 120, the "GetSimilarityScore" module 106 generates a score (e.g., a integer ranging between 0 and 100) indicating the similarity between the SCF representation of the first identified script and the SCF representation of the second identified script, as discussed below, and provides a response 122 to the client device 14D that includes this similarity score. Additionally, in certain embodiments, the "GetSimilarityScore" module 106 may also return an "isDuplicate" flag indicating whether or not the SCF representations of the two identified scripts are semantically equivalent.

The "GetSimilarScripts" module 108 of the script analysis engine 102 is designed to identify SCF representations based on particular script metadata search conditions. That is, the "GetSimilarScripts" module 108 is designed to receive a request 124 that includes script metadata conditions that define particular nodes (e.g., tables, datasets), edges (e.g., actions), and predicates (e.g., fields, conditions). In response to the request 124, the "GetSimilarScripts" module 108 searches the "SCF_Scripts" table 112 to locate stored SCF representations that match the script metadata conditions, and generates a response 126 that includes a list of identifiers (e.g., ScriptIDs) that uniquely identify SCF representations that match the script metadata conditions. In other embodiments, the response 126 may additionally or alternatively include the SCF representations and/or the scripts themselves, in suitable formats. Accordingly, in certain embodiments, the client device 14D may present a list of SCF representations or scripts to the user, to aid in the review or development of various scripts, as discussed above.

FIGS. 5A and 5B illustrate examples of two syntactically different scripts 130 and 132, respectively. Those skilled in the art will recognize that, while scripts 130 and 132 are syntactically different, they are also semantically the same. That is, while the steps may be performed in different orders and using different commands, the overall end result of the two scripts is the same. However, it may not be immediately apparent to a developer that scripts 130 and 132, and especially even more complex scripts, are semantically the same. As such, the disclosed script analysis engine 102 is designed to generate a respective SCF representation for each of the scripts 130 and 132, and these SCF representations can then be compared to determine their similarity to one another.

As mentioned, the disclosed SCF is a topologically-sorted, labeled, directed graph, in accordance with graph theory, that is uniquely representative of a script. Within the SCF representation of a script, database tables and result sets are represented as nodes, actions (e.g., query, delete, and update, count, sum) are represented as edges, and filter/projection predicates (e.g., "priority=1", "user=JohnH.") are represented as labels. Those skilled in the art will appreciated that, while the graph of a SCF representation may be visually depicted, as discussed below with respect to FIG. 6A, the graph of the SCF representation can also be stored in any number of suitable formats. It is presently recognized that, using such a SCF representation, scripts can be represented uniquely in a manner that also supports full/partial search of their structure. That is, the disclosed SCF representation captures the functional aspects of a script and stores them in a form in which is unique with respect to functionality, while also allowing for full/partial searching or matching. In general, the SCF representation of a script may be defined by the graph theory equation:

$$SCF=\{<K,V>/\text{Where } K=\text{Topo sort of } G \text{ and } V=<\text{List of }<GCF>,Map<E,\text{Predicates}>>\} \quad \text{Eq. 1}$$

and more precisely by the graph theory equation:

$$SCF=\{<K,<<\text{List of }<GCF>,Map<E,\text{Predicates}>>/ E \in G(E)\text{edges of the graph}\} \quad \text{Eq. 2}$$

wherein GCF is Graph canonical form and E is a directed edge of the graph.

Figure 6A:
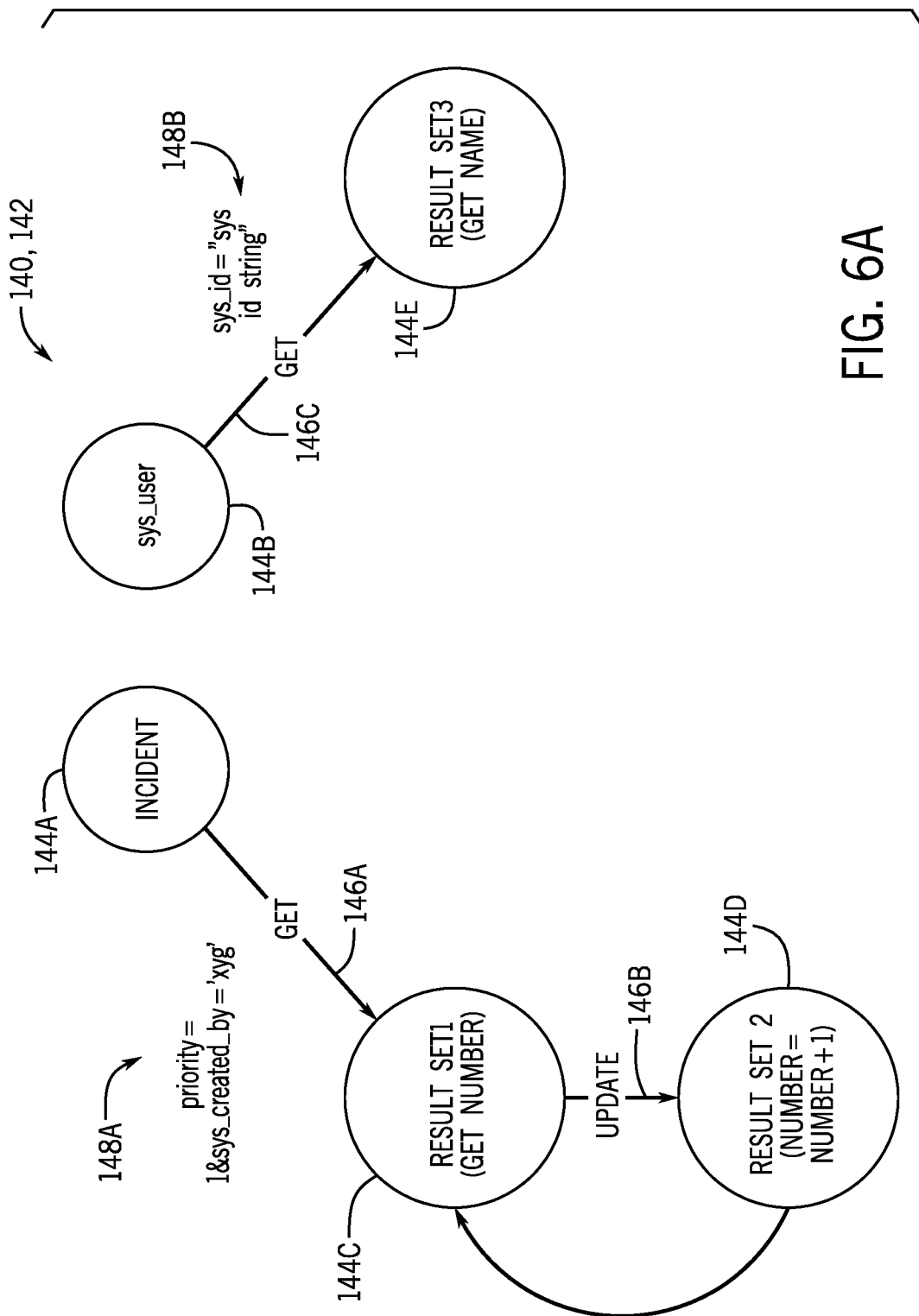
FIG. 6A is a visual depiction of the SCF representation of either the script of FIG. 5A or the script of FIG. 5B, in accordance with embodiments of the present technique.

With the foregoing in mind, FIG. 6A is a visual depiction of a SCF representation 140 of either the script 130 of FIG. 5A or the script 132 of FIG. 5B, in accordance with embodiments of the present technique. The illustrated SCF representation 140 is a labeled, directed graph 142 that includes a number of nodes 144, such as an "Incident" node 144A that corresponds to an "Incident" table, a "sys user" node 144B that corresponds to a "sys user" table, a first result set node 144C, a second result set node 144D, and a third result set node 144E. The illustrated SCF representation 140 also includes a number of edges 146, such as a first edge 146A representing a GET operation, a second edge 146B representing an UPDATE operation, and a third edge 146C representing another get operation. Certain edges include labels 148 that define predicates of the action described by the edges 146. These labels 148 include a first label 148A associated with the first edge 146A and indicating a "Priority" value of "1" and a "Created_By" value of "xyg" as predicates; and a second label 148B associated with the third edge 146C and indicating a "sys_id" value of "sys id string" predicate. Those skilled in the art will appreciate that the graph 142 of the SCF representation 140 is topologically sorted, and indicates to parallel branching paths that execute independently from a semantic point of view.

Figure 6B:
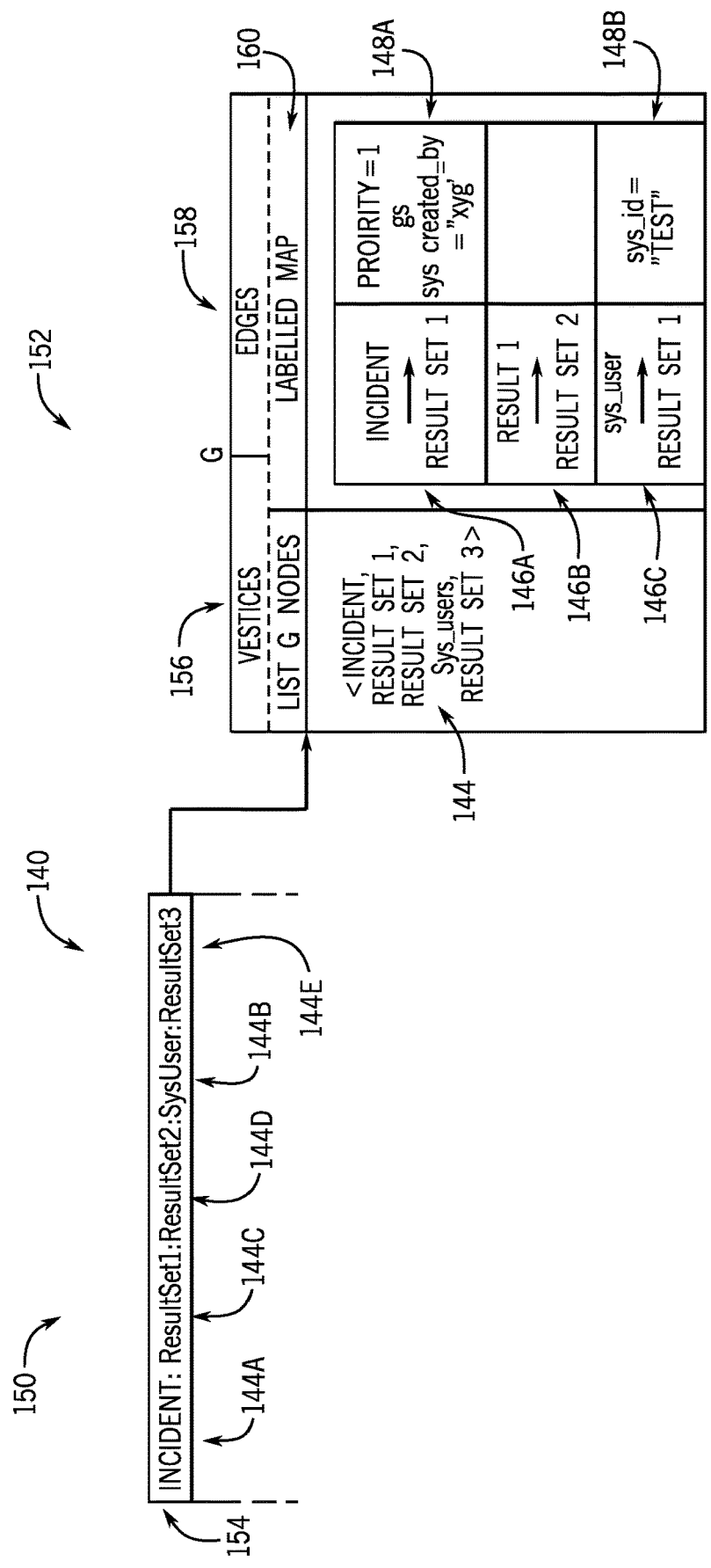
FIG. 6B is a schematic diagram illustrating how the SCF representation of FIG. 6A is stored within the database, in accordance with embodiments of the present technique.

FIG. 6B is a diagram illustrating how the SCF representation 140 illustrated in FIG. 6A is stored within the database 110, in accordance with certain embodiments of the present approach. For the illustrated embodiment, the SCF representation 140 is stored as a <key, value> pair within a suitable data structure, such as a relational database table or a hash table. More specifically, as illustrated, the key portion 150 corresponds to the topologically sorted graph 142 of the SCF representation 140, while the value portion 152 corresponds to the graph 142 itself. The key portion 150 may be stored as or include any suitable data structure, such as a single or multidimensional array. For example, the illustrated key portion 150 includes a first structure 154 (e.g., array, object, string) that includes a topologically sorted list of nodes 144, including the "Incident" node 144A, the "sys user" node 144B, the first result set node 144C, the second result set node 144D, and the third result set node 144E, as discussed above. The key portion 150 may also include additional structures (e.g., arrays, strings) that store a topologically sorted list of edges 146 and/or labels 148, in certain embodiments.

For the SCF representation illustrated in FIG. 6B, the value portion 152 includes the vertices 156 and edges 158 of the graph 142. More specifically, for the illustrated embodiment, the vertices 156 are stored as a list of the nodes 144, while the edges 146 are stored as a labeled map 160. The list of nodes 144 and the labeled map 160 may be stored within any suitable data structures, such as single or multi-dimensional arrays. The illustrated labeled map 160 includes the first edge 146A, the second edge 146B, and the third edge 146C, as discussed above. Further, the data structure storing the first edge 146A is associated with (e.g., part of, linked to) a data structure storing the first label 148A, while the data structure storing the third edge 146C is associated with (e.g., part of, linked to) a data structure storing the second label 148B, as discussed above.

FIG. 7 is a flow diagram depicting an embodiment of a process 170 whereby the script analysis system 100 generates a SCF representation of a script in response to the request 116. As such, the process 170 may correspond with instructions included in the "GetSCF" module 104 discussed above, and may be stored in suitable memory (e.g., memory 86) and executed by suitable a suitable processor (e.g., processor 82 of data center 22) as part of the client instance 42. FIG. 7 is discussed with reference to elements illustrated in FIG. 4. Additionally, the illustrated process 170 is merely an example, and in other embodiments, the process 170 may include additional steps, repeated steps, or fewer steps than illustrated in FIG. 7, in accordance with the present disclosure.

For the illustrated embodiment, the process 170 begins with the processor 82 receiving (block 172) the request 116 to generate the SCF representation for a script. For example, the request 116 may be generated by a client device 14D on the client network 12 based on input or instructions from a user that is associated with a suitable role. As mentioned, the request 116 may include a script in a suitable format to be transmitted to the client instance 42 via the network 18. In response, the processor 82 generates (block 174) the SCF representation for the received script. That is, the processor 82 uses the graph theory definition set forth above, with respect to Eq. 1 and Eq. 2, to construct a topologically-sorted, labeled, directed graph, such as the graph 142 visually depicted in FIG. 6A, as the SCF representation of the received script. Additionally, the processor 82 stores (block 176) the generated SCF representation in the database 110 (e.g., in the "SCF_Scripts" table 112) for later access, as discussed below. Furthermore, in certain embodiments, the processor 82 may also provide (block 178) the generated SCF representation, or a unique identifier for the SCF representation within the database 110, to the requesting client device 14D as the response 118 to the request 116.

FIG. 8 is a flow diagram depicting an embodiment of a process 180 whereby the script analysis system 100 compares the SCF representations of two scripts to generate a similarity score. As such, the process 180 may correspond with instructions included in the "GetSimilarityScore" module 106 discussed above, and may be stored in suitable memory (e.g., memory 86) and executed by suitable a suitable processor (e.g., processor 82 of the data center 22) as part of the client instance 42. FIG. 8 is also discussed with reference to elements illustrated in FIG. 4. Additionally, the illustrated process 180 is merely an example, and in other embodiments, the process 180 may include additional steps, repeated steps, or fewer steps than illustrated in FIG. 8, in accordance with the present disclosure.

For the illustrated embodiment, the process 180 begins with the processor 82 receiving (block 182) the request 120 to determine a similarity score between a first SCF representation and a second SCF representation stored in the database 110. As mentioned, the request 120 may include a first and a second unique identifier (e.g., primary key values) that are respectively associated with the first and the second SCF representations in the database 110. The processor 82 uses the information received in the request 120 to retrieve (block 184) the first and second SCF representations from the database 110. For example, the processor 82 may query the "SCF_Scripts" table 112 of the database 110 using the first and second unique identifier to retrieve records storing the first and second SCF representations.

For the illustrated embodiment, the process 180 continues with the processor 82 comparing (block 186) the first SCF representation and the second SCF representation to generate the similarity score. For example, in an embodiment, the processor 82 may compare the two SCF representations by comparing the nodes, edges, and labels of the two SCF representations and determining a numerical value based on a percentage of nodes, edges, and labels that match (e.g., that are the same, or substantially the same) between the two. For example, in an embodiment in which nodes, edges, and labels are equally weighted, when one SCF representation includes 4/5 of the same nodes, 3/3 of the same edges, and 3/3 of the same labels, then the similarity score may be calculated as (4+3+3)/(5+3+3), or approximately 90, corresponding to a 90% similarity. It may be appreciated that, in other embodiments, the nodes, edges, and labels may not be evenly weighted, and matching nodes, for example, may more substantially increase the similarity score than matching edges or labels. The process 180 concludes with the processor 82 providing (block 188) the determined similarity score to the requesting client device 14D as the response 122 to the request 120.

Figure 9:
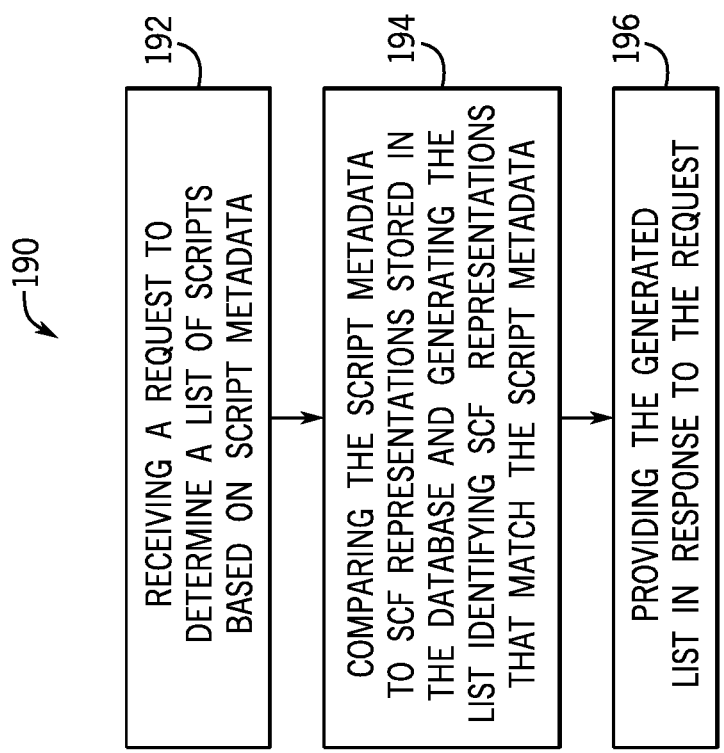
FIG. 9 is a flow diagram depicting an embodiment of a process whereby the script analysis system determines a list of one or more SCF representations stored in the database based on script metadata conditions, in accordance with embodiments of the present technique.

FIG. 9 is a flow diagram depicting an embodiment of a process 190 whereby the script analysis system 100 determines a list of one or more SCF representations stored in the database 110 based on script metadata conditions. As such, the process 190 may correspond with instructions included in the "GetSimilarScripts" module 108 discussed above, and may be stored in suitable memory (e.g., memory 86) and executed by suitable a suitable processor (e.g., processor 82 of the data center 22) as part of the client instance 42. Like FIGS. 7 and 8, FIG. 9 is discussed with reference to elements illustrated in FIG. 4. Additionally, the illustrated process 190 is merely an example, and in other embodiments, the process 190 may include additional steps, repeated steps, or fewer steps than illustrated in FIG. 9, in accordance with the present disclosure.

For the illustrated embodiment, the process 190 begins with the processor 82 receiving (block 192) the request 124 to determine a list of scripts based on particular script metadata search conditions. For example, as mentioned, the request 124 includes script metadata conditions that define particular script features (e.g., nodes, edges, and/or labels). An example of a GUI 200 for defining conditions of a script metadata search is discussed below with respect to FIGS. 10A and 10B. The script metadata conditions received as part of the request 124 may include any suitable number of search conditions, wherein each search condition defines particular script metadata that should be present in SCF representations of scripts identified by the search.

By way of particular example, a request 124 may include a single search condition that identifies a particular table (node), a particular action/operation (edge), and/or particular fields or predicates (labels) that should be part of scripts identified by the search. Accordingly, the processor 82 searches the SCF representations of scripts stored in the database 110 by comparing (block 194) the received script metadata to generate the list of identifiers (e.g., primary key values of the "SCF_Scripts" table) that uniquely identify SCF representations in the database 110. Finally, the processor 82 provides (block 196) the generated list to the requesting client device 14D as the response 126 to the request 124. In certain embodiments, the processor 82 may additionally or alternatively provide, to the requesting client device 14D, the SCF representations and/or the scripts themselves in a suitable format (e.g., a string, a JSON object).

Figure 10A:
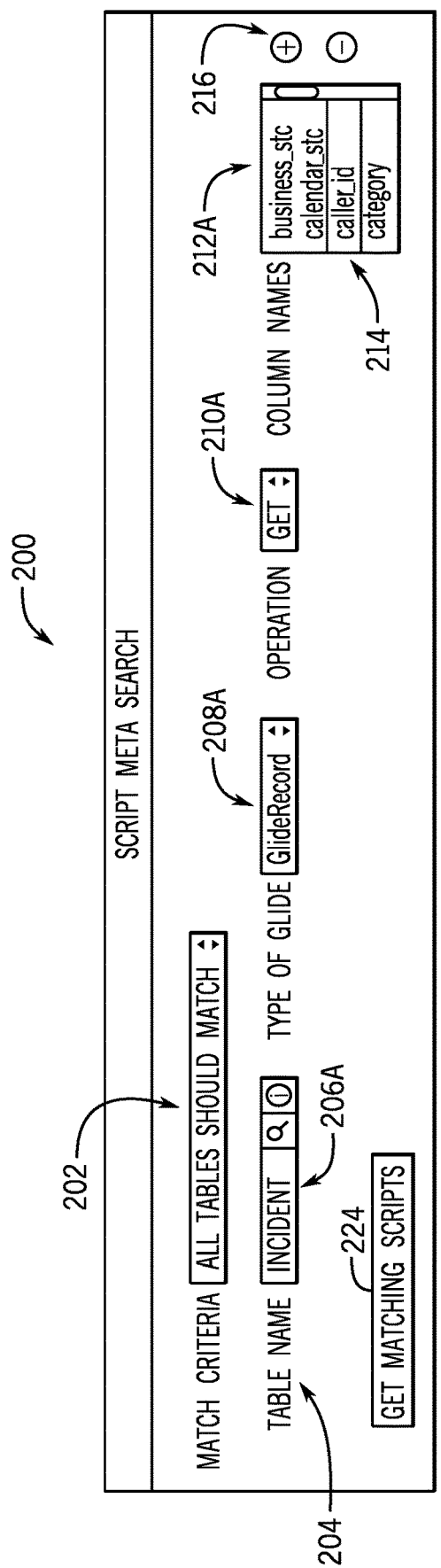
FIGS. 10A and 10B illustrate simulated screenshots of a graphical user interface (GUI) of the script analysis system that enables a user to define script metadata conditions of a script metadata search, in accordance with embodiments of the present technique.

FIG. 10A illustrates a simulated screenshot of a GUI 200 associated with the "GetSimilarScripts" module 108 of the script analysis system 100. More specifically, the GUI 200 is designed to receive inputs (e.g., via client device 14D) to define script metadata conditions to be submitted to the "GetSimilarScripts" module 108 in order to retrieve a list of SCF representations of scripts matching these conditions. The illustrated GUI 200 includes a "Match Criteria" drop-down box 202 that includes options such as "All Nodes Should Match", "All Edges Should Match", "All Labels Should Match", "At Least One Node Should Match", "At Least One Edge Should Match", and so forth. As such, this drop down box 202 defines how the metadata search conditions defined in the remainder of the GUI 200 are searched in the database 110.

The embodiment of the GUI 200 illustrated in FIG. 10A includes a first row 204 designed to receive inputs to define a first condition of the script metadata search. The illustrated first row 204 includes a respective "Table Name" field 206A (e.g., a text box or drop down box), "Type of Glide" drop down box 208A, "Operation" drop down box 210A, and "Column Names" list 212A. It may be appreciated that the "Column Names" list 212A is populated based on the input received by the "Table Name" field 206A, such that the values indicated in the "Column Names" list 212A correspond to the columns of the table in the database 110 identified by the value of "Table Name" field 206A. For the embodiment of the GUI 200 illustrated in FIG. 10A, the "Table Name" field 206A indicates that the table or node associated with the first condition of the script metadata search is the "Incident" table. The "Type of Glide" drop down box 208A and "Operation" drop down box 210A indicate that the action or edge associated with the first condition of the script metadata search is a GlideRecord (e.g., a non-aggregate) query and a "GET" operation. Additionally, the "Column Names" list 212A indicates that a predicate or label associated with the first condition of the script metadata search involves the "caller_id" field 214 of the "Incident" table.

Figure 10B:
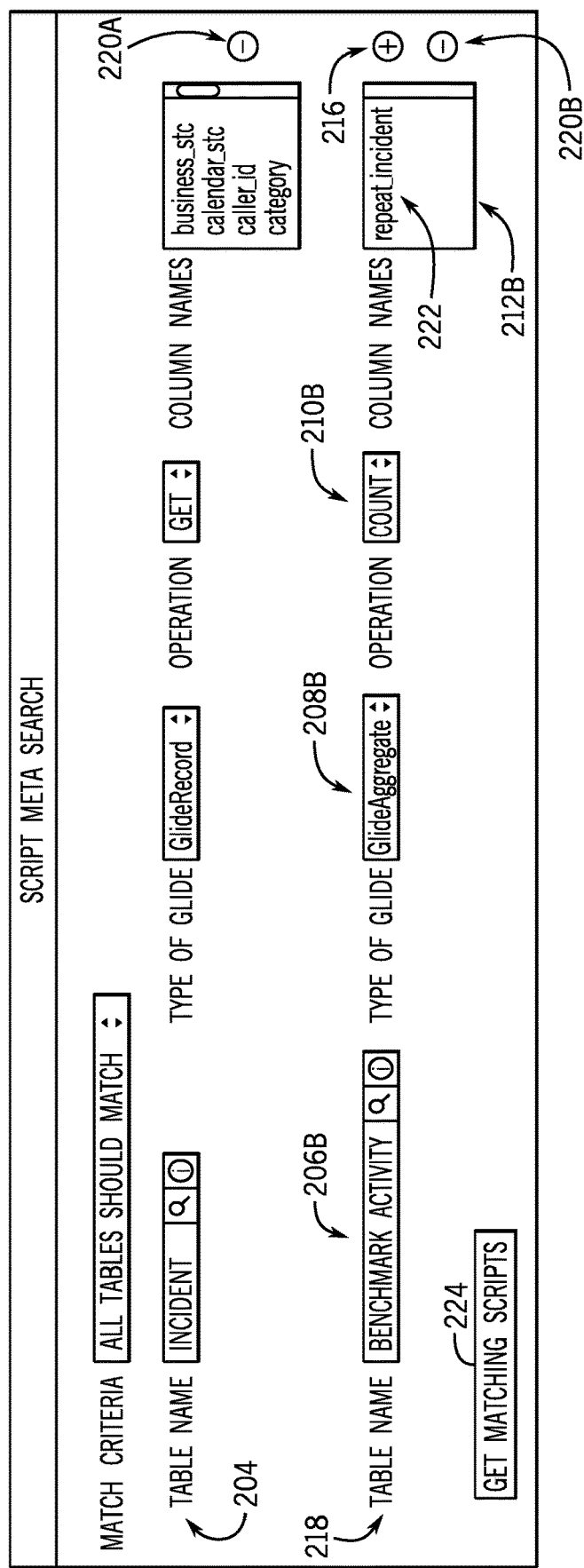

The first row 204 further includes an add row icon 216 (e.g., a plus symbol), and, in response receiving input via this feature, the GUI 200 may add a second row 218 designed to receive inputs to define a second condition of the script metadata search, as illustrated in FIG. 10B. In FIG. 10B, the second row 218 now includes the add row icon 216 for adding additional (e.g., a third, fourth, fifth, and so forth) script metadata conditions to the script metadata search. Additionally, the first and second rows 204 and 218 also include respective remove row icons 220A and 220B (e.g., a minus symbol), and, in response receiving input via this feature, the GUI 200 may remove these rows from the script metadata search conditions. In certain embodiments, the GUI 200 may not allow the final row to be removed via selection of the remove row icons 220A or 220B.

The second row 218 of the GUI 200 illustrated in FIG. 10B is designed to receive inputs to define a second condition of the script metadata search. The illustrated second row 218 includes also respective "Table Name" field 206B (e.g., a text box or drop down box), "Type of Glide" drop down box 208B, "Operation" drop down box 210B, and "Column Names" list 212B. For the embodiment of the GUI 200 illustrated in FIG. 10A, the "Table Name" field 206B indicates that the table or node associated with the second condition of the script metadata search is also the "Incident" table. The "Type of Glide" drop down box 208B and "Operation" drop down box 210B indicate that the action or edge associated with the second condition of the script metadata search is a GlideAggregate query and a "COUNT" operation. Additionally, the "Column Names" list 212B indicates that a predicate or label associated with the first condition of the script metadata search involves the "repeat_incident" field 222 of the "Incident" table.

The GUI 200 illustrated in FIG. 10B also includes a "Get Matching Scripts" button 224. In response to receiving input via the "Get Matching Scripts" button 224, the GUI 200 may use the inputs indicated in the first and second row 204 and 218 to define the script metadata search conditions, and may submit these script metadata conditions to the client instance 42 as part of the request 124, discussed above with respect to FIG. 4. In response, the "GetSimilarScripts" module 108 generates the response 126 that includes the list of SCF representations that match the script metadata search conditions, and provides this list to the client device 14D for presentation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computing system, comprising:
   at least one memory configured to store a database; and
   at least one processor configured to execute instructions stored in the at least one memory to cause the computing system to perform actions comprising:
      generating a script canonical form (SCF) representation of a script by:
         defining a directed graph for the SCF representation,
         identifying datasets of the script and adding the identified datasets as nodes in the directed graph,
         identifying actions of the script and adding the identified actions as edges that connect the nodes of the directed graph, wherein each of the edges comprises a label that defines a predicate of the corresponding action of the script, and
         topologically sorting the directed graph to generate the SCF representation of the script; and
      storing the SCF representation of the script in the database.

2. The computing system of claim 1, wherein the database is configured to store the SCF representation as a <key, value> pair.

3. The computing system of claim 2, wherein the key of the <key, value> pair comprises a topologically sorted list of the nodes of the directed graph.

4. The computing system of claim 2, wherein the value of the <key, value> pair comprises a labeled map of the edges and the labels of the directed graph.

5. The computing system of claim 1, wherein the computing system is configured to perform actions comprising:
   after storing the SCF representation, receiving a request to perform a script metadata search, wherein the request includes script metadata conditions;
   comparing the script metadata conditions to the SCF representation stored in the database; and
   providing the SCF representation or a unique identifier associated with the SCF representation in the database in response to determining that the SCF representation matches the script metadata conditions.

6. The computing system of claim 5, wherein the script metadata conditions specify a particular dataset, a particular action of the script that is performed on the particular dataset, and a particular predicate of the particular action.

7. The computing system of claim 6, wherein the particular predicate specifies a field of the particular dataset and a particular value for the field.

8. The computing system of claim 5, wherein the computing system is configured to perform actions comprising:
   before receiving the request to perform the script metadata search, providing a graphical user interface (GUI), wherein the GUI comprises user interface elements configured to receive user selections of the script metadata conditions, and wherein the GUI is configured to generate the request based on the received user selections.

9. The computing system of claim 1, wherein the computing system is configured to perform actions comprising:
   receiving a request to generate the SCF representation of the script; and providing the SCF representation in response to the request, wherein the SCF representation is configured to be visually depicted on a display of a client device.

10. A method, comprising:
receiving a request to generate a script canonical form (SCF) representation of a script, and in response, generating the SCF representation of the script by:
defining a directed graph for the SCF representation,
identifying datasets of the script and adding the identified datasets as nodes in the directed graph,
identifying actions of the script and adding the identified actions as edges that connect the nodes of the directed graph, wherein each of the edges comprises a label that defines a predicate of the corresponding action of the script, and
topologically sorting the directed graph to generate the SCF representation of the script; and
storing the SCF representation of the script within a collection of SCF representations.

11. The method of claim 10, wherein storing comprises storing the SCF representation as a <key, value> pair within a table, wherein the key is comprises a topologically sorted list of the nodes of the directed graph, and the value comprises a labeled map of the edges and the labels of the directed graph.

12. The method of claim 11, wherein the table is a hash table.

13. The method of claim 10, comprising:
after storing the SCF representation, receiving a second request to perform a script metadata search, wherein the second request includes a script metadata condition;
comparing the script metadata condition to the collection of SCF representations and generating a list of unique identifiers associated with a set of matching SCF representations based on the script metadata condition; and
providing the list of unique identifiers associated with the set of matching SCF representations in response to the second request.

14. The method of claim 13, wherein the script metadata condition comprises:
a particular dataset;
a particular action performed on the particular dataset;
a particular predicate of the particular action; and
a match criteria.

15. The method of claim 14, wherein the match criteria specifies that all nodes of the set of matching SCF representations represent the particular dataset of the script metadata condition, and all actions of the set of matching SCF representations represent the particular action of the script metadata condition, to satisfy the script metadata condition during the script metadata search.

16. The method of claim 14, wherein the match criteria specifies that at least one node of each of the set of matching SCF representations represents the particular dataset of the script metadata condition, and at least one action of each of the set of matching SCF representations represents the particular action of the script metadata condition, to satisfy the script metadata condition during the script metadata search.

17. A computer-readable medium storing instructions executable by a processor of a computing system, the instructions comprising instructions to:
generate a script canonical form (SCF) representation of a script by:
defining a directed graph for the SCF representation,
identifying datasets of the script and adding the identified datasets as nodes in the directed graph,
identifying actions of the script and adding the identified actions as edges that connect the nodes of the directed graph, wherein each of the edges comprises a label that defines a predicate of the corresponding action of the script, and
topologically sorting the directed graph to generate the SCF representation of the script; and
storing the SCF representation of the script within a collection of SCF representations.

18. The medium of claim 17, wherein the instructions comprise instructions to:
after storing the SCF representation, receive a request to perform a script metadata search, wherein the request includes a first script metadata condition comprising a first dataset, a first action performed on the first dataset, and a first predicate of the first action;
compare the script metadata conditions to the collection of SCF representations and generate a set of matching SCF representations that match the script metadata condition; and
providing the set of matching SCF representations in response to the request.

19. The medium of claim 18, wherein second request comprises a second script metadata condition, comprising:
a second dataset;
a second action performed on the second dataset; and
a second predicate of second action.

20. The medium of claim 19, wherein the second request comprises a match criteria, and wherein the match criteria specifies that at least one node, at least one edge, and at least one label of each of the set of matching SCF representations corresponds to the first dataset or the second dataset, the first action or the second action, or the first predicate or the second predicate of the script metadata conditions, respectively, to satisfy the first script metadata condition and the second script metadata condition during the script metadata search.

* * * * *